United States Patent
Norimatsu et al.

(10) Patent No.: US 6,447,921 B1
(45) Date of Patent: Sep. 10, 2002

(54) LOW EMISSIVITY GLASS AND GLASS ARTICLES MADE OF LOW EMISSIVITY GLASS

(75) Inventors: Hodaka Norimatsu; Masahiro Hirata; Yukio Sueyoshi; Akira Fujisawa; Toru Yamamoto, all of Osaka (JP)

(73) Assignee: Nippon Sheet Glass Co., Ltd. (JP)

( * ) Notice: Subject to any disclaimer, the term of this patent is extended or adjusted under 35 U.S.C. 154(b) by 0 days.

(21) Appl. No.: 09/531,899

(22) Filed: Mar. 20, 2000

(30) Foreign Application Priority Data

| Mar. 19, 1999 | (JP) | 11-075635 |
| Nov. 8, 1999 | (JP) | 11-316657 |
| Mar. 15, 2000 | (JP) | 2000-071686 |

(51) Int. Cl.$^7$ .......................... B32B 17/06; B32B 15/04
(52) U.S. Cl. .................. 428/432; 428/34; 428/428; 428/448; 428/699; 428/701
(58) Field of Search .................. 428/34, 432, 428, 428/448, 689, 699, 701

(56) References Cited

FOREIGN PATENT DOCUMENTS

| EP | 0 520 720 A1 | 12/1992 |
| EP | 0 521 602 A1 | 1/1993 |
| EP | 0 627 391 A1 | 12/1994 |
| EP | 0 983 972 A2 | 3/2000 |
| GB | 2 302 102 A | 1/1997 |
| JP | 64-38732 | 2/1989 |
| JP | 8-104547 | 4/1996 |

*Primary Examiner*—Deborah Jones
*Assistant Examiner*—Andrew Piziali
(74) *Attorney, Agent, or Firm*—Rossi & Associates

(57) ABSTRACT

A low emissivity (low-E) glass and glass articles made of the low emissivity glass are provided, which permit controlling the solar heat shading property within a certain range without spoiling the transparency and heat insulating property thereof, to thereby realize a comfortable living condition in a wide region of the world or in a wide location of installment. A plurality of metallic oxide based films comprising metallic oxide are laminated on the surface of a glass substrate. The metallic oxide based films include a tin oxide based film containing antimony (SnSbOx film), and a tin oxide based film containing fluorine ($SnO_2$:F film), and further may include a tin oxide based film consisting essentially of tin oxide, and a silicon oxide based film. The SnSbOx film contains antimony in an amount of 0.01 to 0.2 in terms of mole ratio relative to an amount of tin (=Sb mol/Sn mol), to avoid an excessive decrease in visible light transmittance.

22 Claims, 3 Drawing Sheets

LOW EMISSIVITY GLASS AND GLASS ARTICLES MADE OF LOW EMISSIVITY GLASS

BACKGROUND OF THE INVENTION

1. Field of the Invention

The present invention relates to a low emissivity glass and glass articles made of low emissivity glass, and more particularly, to a low emissivity glass (low-E glass) for use as window glasses for architecture and automobiles and glass articles such as double glazing using low emissivity glass.

2. Prior Art

Generally, different kinds of performance or properties are required of glass for use as window glasses for architecture and automobiles, depending on climate and regional characteristics such as hot or cold weather. Further, the amount of solar radiation energy which penetrates a window glass differs depending on the location and direction in which the window glass is installed, and therefore the performance required of glass also differs depending on the location and direction of installment of the window glass.

For example, in a cold northern region where the weather is severe in winter, the heat insulating property of the glass is important since rooms are heated in winter, while the solar heat shading property of the glass is not considered to be so important. On the other hand, in a hot southern region where the heat is severe, while the heat insulating property is not considered to be so important, it is important that the glass has a solar heat shading property enough to prevent the inflow of solar radiation energy into rooms or or into automobiles, especially in summer.

Further, as to the installation location of the window glass, a larger amount of solar energy penetrates a window glass located on east and west sides of a building or house, which face toward the sun, and thus the window glass to be installed on the east or west side of a building or house needs to have a high degree of solar heat shading. On the other hand, since sunlight does not directly shine a north side of a building or house, solar radiation energy penetrating the window glass is small, and therefore it is preferable to use a window glass having a low degree of solar heat shading.

Conventionally, a window glass formed of a heat insulating glass with an improved solar heat shading property has been proposed in Japanese Laid-Open Patent Publication (Kokai) No. 8-104547 (hereinafter referred to as "the first prior art"), which is comprised of a glass substrate laminated with a layer of Ag and a metallic oxide.

According to the first prior art, a layer of a metallic oxide film sandwiched between two Ag films is laminated on the surface of a glass substrate, to secure required heat insulation, and maintain a high degree of visible light transmittance, securing required transparency of the glass, and further, restrain solar radiation light transmittance, improving the solar heat shading property of the glass. In addition, the metallic oxide is formed of tin oxide or zinc oxide, to keep both the color of transmitting or incident light and the color of reflected light to be achromatic.

Further, the first prior art has proposed a double glazing formed of one or more sheets of the above described insulating glass and has an improved heat insulation when used as a window glass.

However, in the first prior art, since two layers of Ag, which has a high degree of infrared ray reflection, are coated on the surface of the glass substrate, the transmittance rate of solar radiation light is low (60% or less) and therefore the degree of solar heat shading of the glass is extremely high. As a result, when the heat insulating glass according to the first prior art is used on a north side of a building or house, the solar radiation energy inflow into the room is so small that the room becomes excessively cold, leading to an uncomfortable living condition. Especially, in this case where the inflow of solar radiation energy;into the room is small, the room temperature may decrease to a point where it becomes necessary to turn on a heating appliance, causing an unfavorable result in terms of energy saving.

That is, although the first prior art may provide satisfactory results when used in a specific region or in a specific installation location or direction, it may not provide a comfortable living condition depending on the installation location or region.

Further, there has been proposed a switchable light control glass which is formed by causing a substance, which absorbs and reflects light in the visible to near infrared regions, to be precipitated on anisotropic dipolar particles coated with a semiconductor, and then dispersing the anisotropic dipolar particles in a liquid dielectric, whereby the glass can be electrically controlled in absorbance and reflectance (e.g. Japanese Laid-Open Patent Publication (Kokai) No. 64-38732, hereinafter referred to as "the second prior art").

According to the second prior art, the solar heat shading property may be arbitrarily controlled as required, by electrically controlling the absorbance and reflectance.

In the second prior art, however, cohesion or the like of the anisotropic dipolar particles is prone to: occur, leading to degraded quality reliability. Further, the manufacturing cost is high, which makes the glass unpractical for use as window glasses in architecture and automobiles.

SUMMARY OF THE INVENTION

It is therefore an object of the present invention to provide a low emissivity (low-E) glass and glass articles made of the low emissivity glass which permit controlling the solar heat shading property within a certain range without spoiling the transparency and heat insulating property thereof, to thereby realize a comfortable living condition in a wide region of the world or in a wide location of installment.

To attain the above object, the present invention provides a low emissivity glass comprising:

a glass substrate having a surface; and a plurality of metallic oxide based films comprising metallic oxide and laminated on the surface of the glass substrate;

wherein the plurality of metallic oxide based films include a first tin oxide based film containing antimony (hereinafter referred to as "SnSbOx film"), and a second tin oxide based film containing fluorine (hereinafter referred to as "$SnO_2$:F film").

By doping a tin oxide based film comprising tin oxide with fluorine (F) to improve electric conductivity and thereby maintain a desired heat insulating property, and by laminating a tin oxide based film doped with antimony (Sb) on the surface of the glass substrate,,it is possible to achieve control of the solar heat shading property of the glass in a certain range, so that the solar heat shading property can be controlled within a certain range without spoiling the heat insulating property, thus making it possible to obtain a low emissivity glass which is suitable for use in various regions and installment at various locations.

Preferably, the SnSbOx film contains antimony in an amount of 0.01 to 0.2 in terms of mole ratio relative to an amount of tin (=Sb mol/Sn mol), to avoid an excessive decrease in visible light transmittance.

By setting the mole ratio in the SnSbOx film to 0.01 to 0.2, the visible light transmittance slightly decreases, however this demerit is overcome by the fact that the film has an absorbing spectrum in the near-infrared region, thus permitting control of the solar heat shading property within a certain range without spoiling the transparency of the glass.

Preferably, the low emissivity glass comprises a tin oxide film consisting essentially of tin oxide (hereinafter referred to as "$SnO_2$ film") formed on the surface of the glass substrate, and a silicon oxide based film comprising silicon oxide (hereinafter referred to as "$SiO_2$ film") formed thereon, and wherein at least the SnSbOx film and $SnO_2$:F film are laminated on the $SiO_2$ film, to prevent unevenness in the color of reflected light or the color of transmitting or incident light as well as to enable adjustment of color tone.

In a preferred embodiment of the present invention, the SnSbOx film is formed on the $SiO_2$ film, and the $SnO_2$:F film is formed on the SnSbOx film, and wherein the SnSbOx film contains antimony in an amount of 0.01 to 0.2 in terms of mole ratio relative to an amount of tin. In an alternative preferred embodiment, the $SnO_2$:F film is formed on the $SiO_2$ film, and the SnSbOx film is formed on the $SnO_2$:F film.

By forming metallic oxide films on the glass substrate in the above-mentioned order of lamination, it is possible to obtain a low emissivity glass which is satisfactory in both solar heat shading property and heat insulating property as well as transparency without spoiling the appearance.

In a further alternative preferred embodiment of the present invention, the SnSbOx film is formed on the surface of the glass substrate, the $SiO_2$ film is formed on the SnSbOx film, and the $SnO_2$:F film is formed on the $SiO_2$ film.

Even with this lamination order, it is possible to obtain a low emissivity glass which is satisfactory in both solar heat shading property and heat insulating property as well as transparency and also satisfactory in color tone, making it possible to reduce the number of laminated layers of metallic oxide films and thereby enhance productivity.

Preferably, at least one of the $SnO_2$ film, the SnSbOx film, and the $SnO_2$:F film contains chlorine, to thereby enhance electric conductivity.

In manufacturing the low emissivity glass according to the present invention, it is preferable that the glass substrate is formed from glass in a form of a ribbon formed by causing a glass raw material to flow on molten tin, and a plurality of metallic oxide based films are each formed by depositing a metallic oxide in solid phase on a surface of the glass in the form of a ribbon.

According to the above manufacturing method, it is possible to form films on the glass surface heated to a temperature above its softening point, leading to an improvement in properties of the films, and other properties. Further, productivity is also improved, such that an efficient mass production of low-E glass is realized.

To attain the above object, the present invention provides a glass article comprising a plurality of glass plates, at least one of which is formed of any one of the above-mentioned low emissivity glasses, wherein a plurality of glass plates are arranged in opposed relation to each other with a hollow layer defined therebetween.

It is known that a double glazing unit as a glass article which has a hollow layer such as an air layer, inert gas layer, or reduced pressure or vacuum layer, defined between a plurality of glass plates exhibits very excellent performance in terms of heat insulating property. Therefore, if the glass article according to the present invention is used as window glasses for architecture, it is possible to realize a comfortable living condition by selecting the excellent solar heat shading property or the excellent heat insulating property.

The above and other objects, features and advantages of the invention will become more apparent from the following detailed description taken in conjunction with the accompanying drawings.

DETAILED DESCRIPTION

To obtain a low emissivity glass which exhibits an excellent heat insulating property as well as suitability to various installation locations, the solar heat shading property should be controlled within a certain range. To achieve this, it is necessary to improve the solar heat shading property to an appropriate degree.

It is known that to enhance the electric conductivity is effective in improving the heat insulating property, and it is already employed to improve the electric conductivity by doping a tin oxide based film comprising tin oxide (hereinafter referred to as "$SnO_2$ film") with fluorine (F), to thereby achieve a desired heat insulating property.

Therefore, in order to achieve a required heat insulating property as well as enable control of the solar heat shading property of the glass in a certain range, the present inventors conducted extensive studies and reached a finding that if a $SnO_2$ film doped with antimony (Sb) is laminated on a glass substrate in addition to the above-mentioned $SnO_2$ film doped with fluorine, the solar heat shading property can be controlled within a certain range, without spoiling the heat insulating property, thus making it possible to obtain a low emissivity glass which is suitable for use in various regions and installment at various locations.

The present invention is based upon the above finding.

The present invention will now be described in detail with reference to the drawings showing embodiments thereof.

Figure 1:
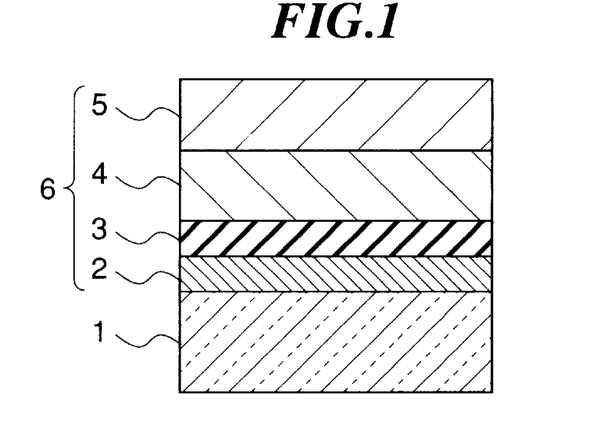
FIG. 1 is a cross-sectional view of the structure of a low emissivity glass according to a first embodiment of the present invention.

FIG. 1 is a cross-sectional view of a low emissivity glass according to a first embodiment of the invention.

In FIG. 1, reference numeral 1 designates a glass substrate, which has a tabular shape and is formed of a heat absorbing glass such as soda-lime glass or soda-lime glass containing a slight amount of a coloring ingredient. A $SnO_2$ film 2 is formed on a surface of the glass substrate 1, a $SiO_2$ film 3 is formed on the surface of the $SnO_2$ film 2, a SnSbOx film 4 is formed on the surface of the SiO2 film 3, and a $SnO_2$:F film 5 is formed on a surface of the SnSbOx film 4.

The $SnO_2$ film 2, SiO2 film 3, SnSbOx film 4, and $SnO_2$:F film 5 constitute a metallic oxide based layer 6 laminated on the surface of the glass substrate 1.

Since the SnO2 film 2 and SiO2 film 3 are laminated in the order shown in FIG. 1 between the glass substrate 1 and the SnSbOx film 4, unevenness in the colors of reflected light and transmitting or incident light can be prevented, and the color tone can be adjusted, thereby obtaining a low emissivity glass having desired solar heat shading and heat insulating properties while satisfying the color tone.

In the present embodiment, the antimony content in the SnSbOx film 4 is adjusted so that a mole ratio of antimony to tin (=Sb mol/Sn mol) is 0.01 to 0.1. Further, the fluorine content in the $SnO_2$:F film 5 is set to 0.01 to 1 wt %. The reasons why the antimony and fluorine contents have been set as stated above are as follows:

(a) Antimony Content

Antimony contributes to improvement of electric conductivity and thereby acts to improve the solar heat shading property of a glass. However, if the antimony content relative to the tin content in the SnSbOx film, in terms of mole ratio, is less than 0.01, the desired solar heat shading property cannot be achieved, whereas, if the antimony content, in terms of mole ratio, exceeds 0.1, the adjustment of color tone becomes difficult because of the lamination order of the films, resulting in an unevenness in color and hence a lower quality of the glass. Therefore, in the present embodiment, the antimony content in the SnSbOx film has been set to such a value that the mole ratio is in the range of 0.01 to 0.1.

(b) Fluorine Content

Fluorine, like antimony, contributes to improvement of electric conductivity and thereby acts to improve the solar heat shading property of a glass. Further, doping the $SnO_2$ film with fluorine lowers the emissivity of a glass, thus improving the heat insulating property. However, if the fluorine content in the $SnO_2$ film is less than 0.01 wt %, the above effects cannot be achieved to a desired extent, whereas, if the fluorine content in the $SnO_2$ film exceeds 1 wt %, the visible light transmittance is lowered and the glass looses its transparency, causing discomfort to people in the room or the automobile. Therefore, in the present embodiment, the fluorine content has been limited to 0.01 to 1 wt %.

The thickness of each film in the metallic oxide film 6 in the present embodiment is limited as follows: $SnO_2$ film 2 and $SiO_2$ film 3: 10 nm to 50 nm, SnSbOx film 4: 20 nm to 300 nm, and $SnO_2$:F film 5: 200 nm to 500 nm. The reasons for limiting the thickness of each film as above will be explained below.

(a) $SnO_2$ Film 2 and $SiO_2$ Film 3

The $SnO_2$ film 2 and $SiO_2$ film 3 are subjected to adjustment of color tone utilizing a light interference phenomenon caused by the difference of refractive index between the two films. However, if the thickness of both these films are less than 10 nm or more than 50 nm, the color tone adjustment becomes difficult to perform when the SnSbOx film 4 and $SnO_2$:F film 5 are laminated on the $SiO_2$ film 3, resulting in an unevenness in color and hence a lower quality of the glass. Therefore, in the present embodiment, the thickness of the $SnO_2$ film 2 and $SiO_2$ film 3 has been set to the range of 10 nm to 50 nm.

The $SnO_2$ film can be formed at a lower cost than ITO (Indium Tin Oxide) film, and the like and further, has excellent durability. Therefore, in the present embodiment, it is possible to manufacture a highly durable $SnO_2$ film at a low cost.

(b) SnSbOx Film 4

Since the SnSbOx film 4 contains antimony (Sb), it acts to improve the heat resisting property of a glass. However, if the thickness of the SnSbOx film 4 is less than 20 nm, the heat resisting property cannot be achieved to a desired degree, and further, it becomes difficult to control the thickness of the film according to the modern manufacturing technology so that uniformity in the thickness of the film cannot be maintained.

On the other hand, while it is generally considered to be preferable that glass for use in residential buildings should have a low haze ratio indicative of the ratio of diffuse transmittance (=total transmittance−direct transmittance) to total transmittance, when the thickness of the film of the SnSbOx film 4 exceeds 300 nm, the total thickness of the metallic oxide based film 6 becomes excessively large and the haze ratio increases to such a value that the glass is no longer suitable for use as residential window glasses. Therefore, in the present embodiment, the thickness of the SnSbOx film 4 has been limited to 20 nm to 300 nm.

(c) $SnO_2$:F Film 5

Since the $SnO_2$:F film 5 contains fluorine (F), it has decreased emissivity and hence contributes to improvement of electric conductivity. However, if the thickness of the $SnO_2$:F film 5 is less than 200 nm, the heat resisting property cannot be achieved to a satisfactory degree, whereas, if the thickness of the $SnO_2$:F film 5 exceeds 500 nm, the total thickness of the metallic oxide based film 6 becomes excessively large, and as is the case with the SnSbOx film 4, the glass becomes unsuitable for use as residential window glasses. Therefore, in the present embodiment, the thickness of the $Sno_2$:F film 5 has been limited to 200 nm to 500 nm.

The thickness of each film and the contents of antimony and fluorine can be set within the above stated ranges depending upon the required heat resisting property, heat insulating property, and reflection color tone and others. However, it is preferable that the thickness of the films should be limited within the following ranges: $SnO_2$ film 2: 36 nm to 45 nm; $SiO_2$ film 3: 19 nm to 26 nm; SnSbOx film 4: 190 nm to 230 nm; and $SnO_2$:F film 5: 210 nm to 260 nm. Further, it is more preferable that the mole ratio of the antimony content in the SnSbOx film 4 should be 0.02 to 0.04, and the fluorine content in the $SnO_2$:F film 5 is 0.3 wt % to 0.6 wt %.

Glass according to a preferred embodiment of the present invention which has the above described film-laminated structure and the antimony and fluorine contents maintains high visible light transmittance, possesses a good heat resisting property as well as a sufficient heat insulating property, and also keeps reflection color tone to a natural and neutral color tone when viewed frontally or diagonally.

Next, description will be given of raw materials which are used to form the metallic oxide based film 6.

There are various methods to form a metallic oxide based film on the glass substrate 1, such as vacuum deposition, sputtering, and painting. However, in view of productivity and durability (resistance to stripping) of the film, the CVD method or a spraying method such as solution spraying, dispersion spraying, and powder spraying is preferred.

As tin raw materials used to form the $SnO_2$ film 2 by the CVD method, from a point of view of enhancing. electric conductivity, it is preferable to use tin compounds which contain chlorine, such as monobutyltin trichloride, tin tetrachloride, dimethyltin dichloride, and dibutyltin dichloride, dioctyltin dichloride. However, substances such as tetramethyltin, tetrabutyltin, dibutyltin diacetate may also be used. Further, as oxidizing materials, oxygen, water vapor, dry air and others may be used.

As tin raw materials used to form the $SnO_2$ film 2 by the spraying method, the same substances as mentioned for the above CVD method are preferred in terms of enhancing electric conductivity, that is, tin compounds which contain chlorine, such as monobutyltin trichlbride, tetrachloridetin, dimethyltin dichloride, dioctyltin dichloride, and dioctyltin dichloride. However, substances such as tetramethyltin, tetraoctyltin, dibutyltin oxide, dibutyltin dilaurate, monobutyltin fatty acid, dibutyltin fatty acid, dibutyltin diacetate, and dioctyltin dilaurate may also be used.

Further, silicon raw materials which may be used to form the $SiO_2$ film 3 by the CVD method should preferably be silan based compounds such as monosilane, disilane, trisilane, monochlorosilane, 1,2-dimethylsilane, 1,1,2-trimethyldisilane, and 1,1,2,2-tetramethyldisilane, and further, tetramethylorthosilicate, tetraethylorthosilicate, and the like. As oxidizing materials, oxygen, water vapor, dry air, carbon dioxide, carbon monoxide, nitrogen dioxide, and ozone may be used.

When a silane base compound is used as the silicon raw material, it is preferable to add in an appropriate amount unsaturated hydrocarbon such as ethylene, acetylene, and toluene, so as to suppress reaction of the silane base compound before it reaches the surface of the glass substrate 1, as well as to control the refractive index of the the $SiO_2$ film 3.

Further, when tetramethylorthosilicate, tetraethylorthosilicate and the like are used as the. silicon raw material, it is preferable to add a substance such as aluminum iso-propoxide in order to accelerate the forming speed of the film.

Still further, substances such as tetramethylorthosilicate and tetraethylorthosilicate may be used as the silicon raw material to form the $SiO_2$ film 3 by the spraying method, in which case it is preferable to add a substance such as aluminum iso-propoxide in order to accelerate the forming speed of the film.

Further, as the antimony compound to form the SnSbOx film 4, it is possible to use antimony trichloride and antimony pentachloride, and as the fluorine compound to form the $SnO_2$:F film 5, it is possible to use hydrogen fluoride, trifluoroacetic acid, bromotrifluoromethane, chlorodifluoromethane and difluoroethane.

Figure 2:
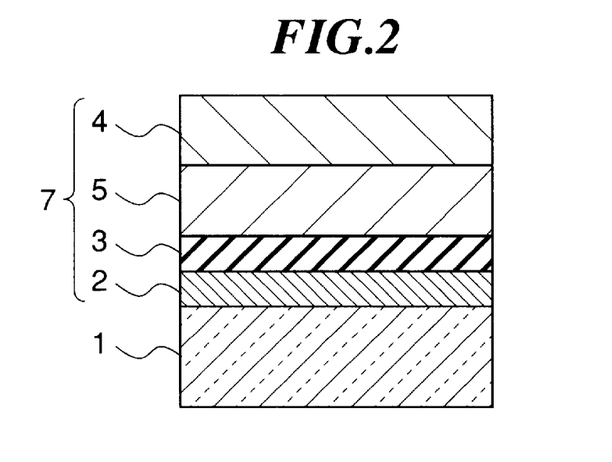
FIG. 2 is a cross-sectional view of the structure of a low emissivity glass according to a second embodiment of the present invention.

FIG. 2 is a cross-sectional view of the structure of a low emissivity glass according to a second embodiment of the present invention. In the second embodiment, the glass substrate 1 is configured in a similar manner to that of the first embodiment, in which the $SnO_2$ film 2 is formed on the surface of the glass substrate 1 and the $SiO_2$ film 3 is formed on the surface of the $SnO_2$ film 2, but the $SnO_2$:F film 5 is formed on the surface of the $SiO_2$ film 3 and the SnSbOx film 4 is formed on the surface of the $SnO_2$:F film 5. The $SnO_2$ film 2, $SiO_2$ film 3, $SnO_2$:F film 5, and SnSbOx film 4 constitute a metallic oxide based film 7 laminated on the surface of the glass substrate 1.

In the second embodiment, due to the lamination order of the metallic oxide based film 7, the antimony content in the SnSbOx film 4 is adjusted so that the mole ratio of antimony to tin is 0.01 to 0.2. That is, although antimony contributes to improvement of electric conductivity and thereby acts to improve the solar heat shading property of the glass, when the antimony content relative to the tin content in the SnSbOx film 4, in terms of mole ratio, is less than 0.01, the solar heat shading property is not enhanced. On the other hand, unlike the first embodiment (FIG. 1), even when the antimony content relative to the tin content in the SnSbOx film 4, in terms of mole ratio, exceeds 0.1, it is possible to make an adjustment to color tone because of the lamination order. However, when the mole ratio exceeds 0.2, visible light transmittance is lowered and the glass has lower transparency, causing discomfort to people in the room or the automobile. Therefore, in the second embodiment, the antimony content in the SnSbOx film has been set to such a value that the mole ratio is in the range of 0.01 to 0.2.

By setting the mole ratio to 0.01 to 0.2 in the SnSbOx film, although the visible light transmittance slightly decreases, this demerit is overcome by the fact that the film has an absorbing spectrum near the infrared region, thus permitting control of the solar heat shading property within a certain range without spoiling the transparency of the glass.

The other film forming conditions (thickness of the film, fluorine content in the $SnO_2$:F film 5 film, and raw materials used) are similar to those of the first embodiment.

Figure 3:
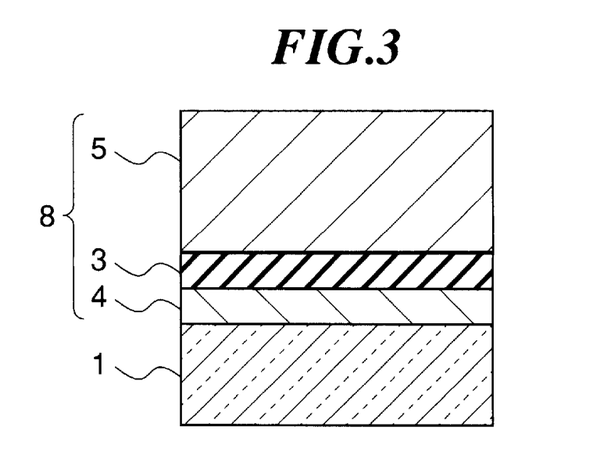
FIG. 3 is a cross-sectional view of the structure of a low emissivity glass according to a third embodiment of the present invention.

FIG. 3 is a cross-sectional view of the structure of a low emissivity glass according to a third embodiment of the present invention. In the third embodiment, the glass substrate 1 is configured in a similar manner to that of the first and second embodiments, in which the SnSbOx film 4 is formed on the surface thereof, the $SiO_2$ film 3 is formed on the surface of SnSbOx film 4, and the $SnO_2$:F film 5 is formed on the surface of the $SiO_2$ film 3. The SnSbOx film 4, SiO2 film 3, and $SnO_2$:F film 5 constitute a metallic oxide based film 8 laminated on the surface of the glass substrate 1.

In the third embodiment, the thickness of each film is limited as follows: SnSbOx film 4: 10 nm to 50 nm, SiO2 film 3: 10 nm to 50 nm, and $SnO_2$:F film 5: 200 nm to 500 nm.

In the first and second embodiments, the $SnO_2$ film 2 and $SiO_2$ film 3 are sequentially laminated on the glass substrate 1 to ensure that the color tone can be adjusted depending on these films. In contrast, in the third embodiment the SnSbOx film 4 and the SiO2 film 3 are laminated on the glass substrate 1, and by controlling the thickness of these films, the color tone can be adjusted as in the case in which the SnO2 film 2 and SiO2 film 3 are laminated on the glass substrate 1. This makes it possible to reduce the number of laminated layers of the metallic oxide based film 8, and thus enhance productivity. That is, by limiting the thickness of the SnSbOx film 4 and the $SiO_2$ film 3 to almost the same thickness chosen in a certain range, it becomes possible to control the color tone as desired and obtain a low-E glass which has an excellent heat insulating property and transparency, as well as a desired solar heat shading property.

The thickness of the SnSbOx film 4 and the SiO2 film 3 has each been limited to 10 nm to 50 nm because a satisfactory solar heat shading property and color tone cannot be achieved when the thickness of the films is less than 10 nm, and because satisfactory color tone cannot be achieved when the thickness of the films exceeds 50 nm.

Further, the thickness of the $SnO_2$:F film 5 has been limited to 200 nm to 500 nm for the same reasons as in the first embodiment, that is, if the thickness of the film is less than 200 nm, the solar heat shading property cannot be achieved to a satisfactory degree, whereas, if the thickness of the film exceeds 500 nm, the haze ratio increases to such a value that the glass is no longer suitable for use as residential window glasses.

In the third embodiment as well, it is possible to use the same raw materials as described in the first and second embodiments, and further the antimony content and fluorine content are limited to the same values as in the second embodiment, that is, 0.01 to 0.2 mole ratio, and 0.01 to 1 wt %, respectively.

The low-E glass according to the present invention has been described above by referring to the first to third embodiments. However, the low-E glass according to the present invention is not limited to these embodiments, and may be applied to other multi-layer metallic oxide based films which include at least the SnSbOx film 4 and the $SiO_2$ film 3.

A method of manufacturing the low-E glass will now be described in detail.

In order to form the above-mentioned metallic oxide based films on a glass substrate, it is possible to use the aforementioned methods such as vacuum deposition, sputtering, and painting. Still, in terms of productivity and durability, the chemical vapor deposition (hereinafter referred to as "CVD") method, in which a chemical reaction is induced in a gaseous compound on the glass substrate so that the depositions from the chemical reaction form a film on the glass substrate, or the spraying method such as solution spraying is preferred.

However, for an efficient mass production of high quality low-E glass with improved film properties and productivity, it is most preferable to manufacture a ribbon-like glass (ribbon glass) as a glass substrate by a so-called floating method. Then, the ribbon glass is subjected to an on-line CVD method such that thermal decomposition CVD is carried out utilizing the heat energy of the glass ribbon, so that films are formed on the glass ribbon.

Figure 4:
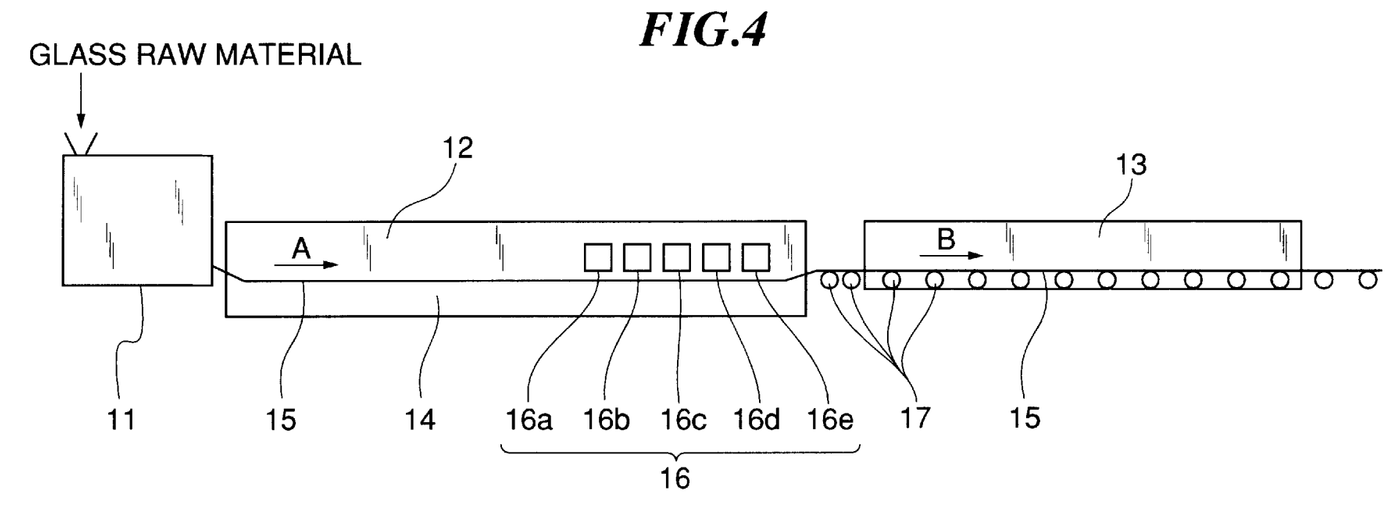
FIG. 4 is a schematic view showing the configuration of a on-line CVD apparatus.

FIG. 4 is a schematic view showing the configuration of the on-line CVD apparatus. The on-line CVD apparatus is comprised of a melting furnace 11, into which a glass raw material is charged and melted in a high temperature atmosphere, a bath 12, into which the resulting molten glass is poured, and a lehr 13 in which a glass ribbon 15 drawn from the bath 12 is slowly cooled. The bath 12 contains a predetermined amount of molten tin 14, and is provided with a film-forming raw material supply part 16 comprised of first to fifth film-forming raw material supply ports 16a to 16e at a downstream portion thereof. The film-forming raw material supply part 16 is disposed in such a manner that the ports 16a to 16e each cover the width of the glass ribbon 15. The number of the film-forming raw material supply ports may be changed depending on the number of layers or the thickness of the films to be formed on the glass ribbon.

In the on-line CVD apparatus constructed as above, when a predetermined glass raw material powder is charged into the melting furnace 11 heated to 1500 to 1600° C., the glass raw material powder melts in the melting furnace 11 into a molten glass which pours into the bath 12 containing the molten tin 14. Since the specific gravity of the molten glass is smaller than that of the molten tin 14, the molten glass floats on top of the molten tin 14 and moves in a direction as indicated by an arrow A, into a ribbon-like shape as the glass ribbon 15. Then, the glass ribbon 15 is conveyed downstream to the film-forming raw material supply part 16 while being maintained at a high temperature (for example, between 600 to 750° C.).

Then, film-forming raw materials are supplied through the film-forming raw material part 16 onto the surface of the glass ribbon 15. Thermal decomposition of the film-forming raw materials occurs on the glass ribbon 15 due to the heat energy of the glass ribbon 15, and thus a desired metallic oxide based film is formed on the glass ribbon 15. For example, to prepare the metallic oxide based film 6 as shown in FIG. 1, a tin compound diluted with nitrogen, oxygen and water are supplied from the first film-forming raw material supply port 16a onto the surface of the ribbon glass 15 to form the $SnO_2$ film 2 as a first layer. Then, a silicon compound diluted with nitrogen, oxygen and, if required, unsaturated hydrocarbon such as ethylene are supplied from the second film-forming raw material supply port 16b onto the $SnO_2$ film 2 to form the $SiO_2$ film 3 as a second layer. Next, a mixture gas of a tin compound diluted with nitrogen, an antimony compound, oxygen and water steam is supplied from the third film-forming raw material supply port 16c onto the surface of the $SiO_2$ film 3 to form the $SnSbO_x$ film 4 as a third layer. Finally, a mixture gas of steams of a tin compound and a fluorine compound diluted with nitrogen, water and steam is supplied from the fourth film-forming raw material supply part 16d onto the surface of the the $SnSbO_x$ film 4 to form the $SnO_2$:F film 5 as a fourth layer. When laminating a film having a large thickness, the same film-forming raw material is divided into a plurality of batches (for example, through film-forming raw material supply ports 16d and 16e used to form fourth and fifth layers) and supplied onto the surface of glass ribbon 15.

The glass ribbon 15 thus having films formed as above is pulled into the lehr 13 by a plurality of rollers 17, conveyed in a direction indicated by an arrow B, and sequentially discharged from the lehr 13.

Since the formation of films according to the on-line CVD method described above is carried out by the thermal decomposition utilizing the heat energy of the glass ribbon 15, it is possible to form films on the glass surface heated to a temperature above its softening point, leading to an improvement in properties of the films, increased film-forming reaction speed and enhanced film-forming reaction efficiency. Further, productivity is also improved, such that an efficient mass production of low-E glass is realized.

As other manufacturing methods, the above mentioned CVD method or spraying method is preferred.

The metallic oxide based film can be formed by the CVD method in such a manner that a material for the glass substrate 1 is cut into a desired shape, the resulting glass substrate 1 is heated to a predetermined high temperature, and the heated glass substrate 1 is sprayed with steam for formation of a film thereon. For example, the glass substrate 1 is conveyed on a mesh belt into a heating furnace, and a film-forming material is sprayed onto the glass substrate 1 while passing the heating furnace, to cause a reaction on the surface of the glass substrate 1 so that a desired film is formed on the glass substrate 1.

In forming the metallic oxide based film by the spraying method, in the case of using the solution spraying method, a solution containing a predetermined metallic compound is sprayed onto the glass substrate 1 heated to a high temperature, and in the case of using the dispersion spraying method, a dispersion is prepared in place of the above solution, by dispersing particles of a predetermined metallic compound into a solution or a solvent, and the prepared dispersion is sprayed onto the glass substrate 1 heated to a high temperature. Further, in the case of using the powder spraying method, a powder of a predetermined metallic compound is sprayed onto the glass substrate 1 heated to a high temperature.

A comparison between the CVD method and the spraying method showed that in the case of the spraying method, it is difficult to control droplets or powder to be sprayed, and it is also difficult to control reaction products and undecomposed products, so that evenness in the film thickness cannot be easily achieved and the laminated glass has large strain. Therefore, the CVD method is more preferable for manufacturing the metallic oxide based film.

Figure 5:
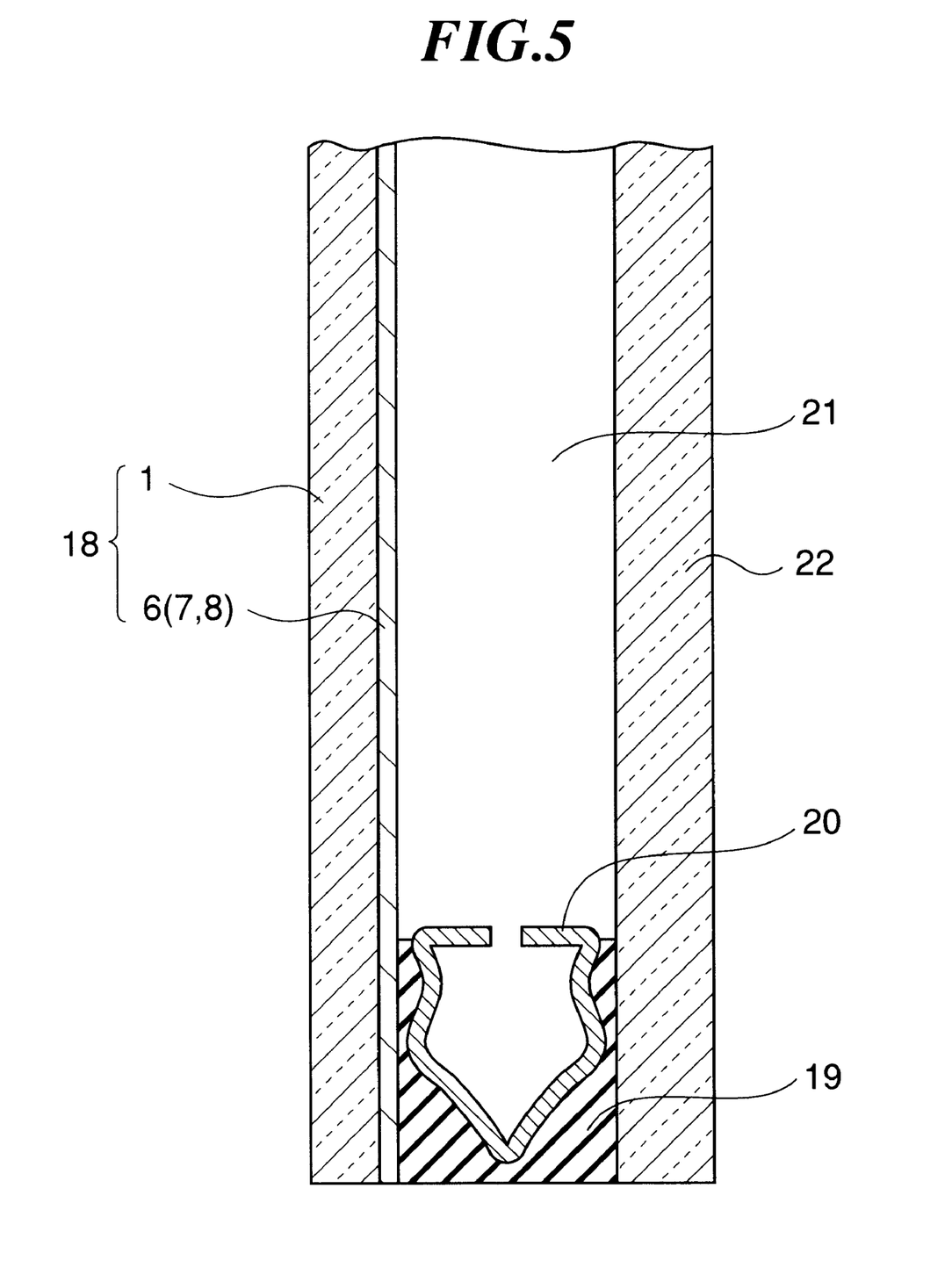
FIG. 5 is a cross-sectional view of an essential part of a double glazing unit as an glass article according to an embodiment of the present invention.

FIG. 5 is a cross-sectional view of an essential part of a double glazing unit as an glass article according to an embodiment of the present invention, which is formed of the low-E glass according to the present invention. The double glazing unit in FIG. 5 is comprised of the low-E glass 18 with the metallic oxide based film 6 (7, 8) laminated thereon, a glass plate 22 formed of soda-lime glass or the like, which is disposed in opposed relation to the low-E glass in a fashion facing the metallic oxide based film 6 (7, 8), and a spacer 20 containing a drying agent interposed between the two members 18, 22 at respective end portions thereof. A sealing material 19 formed of butyl rubber or the like is filled in a gap between the above respective end portions of the members 18, 22 to seal the gap, and a hollow layer 21 is thereby defined and enclosed by the low-E glass 18, glass plate 22, spacer 20, and sealing material 19.

It is generally recognized that double glazing of this kind is able to enhance the heat insulating property compared with a single glass plate. The low-E glass according to the present invention permits controlling its solar heat shading property within a certain range without degrading the visible right transmittance and the heat insulating property. Therefore, by employing the low-E glass 18 of the present invention, it is possible to obtain a double glazing unit which has a further enhanced solar heat shading property without degrading the heat insulating property, to thereby enable realization of a comfortable living condition irrespective of the region and location where the double glazing unit is used.

The hollow layer 21 is usually an air layer filled with air. However, it may be an inert gas layer filled with an inert gas such as argon gas, or a reduced pressure layer formed by evacuating air therefrom. If the reduced pressure layer is employed as the hollow layer 21, the heat insulating property can be further enhanced. Further, if the reduced pressure layer is employed, it is preferable to form the sealing material 19 of a low melting point glass in place of butyl rubber, and further, it is also preferable to arrange spacer members at suitable locations in the reduced pressure layer, to adjust the spacing between the low-E glass 18 and the glass plate 22.

EXAMPLE

Next, examples of the present invention will be explained.

A float plate glass which is 10 cm in length, 10 cm in width, and 3 mm in thickness was cleaned and dried, and the float plate glass was used as the glass substrate 1, on which a multilayer film was formed by the CVD method. More specifically, the glass substrate 1 was conveyed by an open-to-air type mesh belt into a heating furnace heated to approximately 570° C., and a predetermined film-forming material was supplied onto the glass substrate 1 while the glass substrate 1 passed the heating furnace to cause a chemical reaction on the glass substrate 1 to cause precipitation of a solid phase, thereby forming metallic oxide based films 6, 7, and 8 as Examples Nos. 1–8 according to the present invention and Comparative Examples Nos. 1–4.

Table 1 shows the chemical compositions, mole ratio between antimony and tin, film kind, and film thickness of the thus formed metallic oxide based films of Examples Nos. 1–8 according to the present invention and Comparative Examples Nos. 1–4.

The examples according to the present invention and the comparative examples will now be described.

Example 1

First, as a tin raw material, monobutyltin trichloride containing chlorine was used. Steam of the monobutyltin trichloride, oxygen and nitrogen were blended in a predetermined mole ratio into a raw material gas. The raw material gas was supplied onto the glass substrate 1 to form the $SnO_2$ film 2 having a film thickness of 25 nm as a first layer on the glass substrate 1. Then, as a silicon raw material, monosilane was used, and the monosilane, oxygen, nitrogen, and ethylene as an additive were blended in a predetermined mole ratio into a raw material gas. This raw material gas was supplied onto the $SnO_2$ film 2 to form the $SiO_2$ film 3 having a film thickness of 25 nm as a second layer on the $SnO_2$ film 2. Then, monobutyltin trichloride containing chlorine was used as a tin raw material, and antimony trichloride as an antimony compound, and steam of the monobutyltin trichloride, oxygen, steam of the antimony trichloride, and nitrogen were blended in a predetermined mole ratio into a raw

TABLE 1

| | COMPOSITION (MOLE RATIO) OF RAW MATERIAL GAS | | | | | | | Sb/Sn | | FILM THICKNESS |
|---|---|---|---|---|---|---|---|---|---|---|
| | $N_2$ | $O_2$ | HF | Sn | Sb | Si | $C_2H_4$ | (MOLE RATIO) | FILM KIND | (nm) |
| EXAMPLES ACCORDING TO PRESENT INVENTION | | | | | | | | | | |
| 1 | | | | | | | | | | |
| 1ST LAYER | 6 | 4 | 0 | 1 | 0 | 0 | 0 | | $SnO_2$ | 25 |
| 2ND LAYER | 200 | 4 | 0 | 0 | 0 | 1 | 6 | | $SiO_2$ | 25 |
| 3RD LAYER | 30 | 15 | 0 | 10 | 1 | 0 | 0 | 0.04 | $SnSbOx$ | 200 |
| 4TH LAYER | 6 | 4 | 1 | 4 | 0 | 0 | 0 | | $SnO_2$:F | 250 |
| 2 | | | | | | | | | | |
| 1ST LAYER | 6 | 4 | 0 | 1 | 0 | 0 | 0 | | $SnO_2$ | 25 |
| 2ND LAYER | 200 | 4 | 0 | 0 | 0 | 1 | 6 | | $SiO_2$ | 25 |

TABLE 1-continued

| | COMPOSITION (MOLE RATIO) OF RAW MATERIAL GAS | | | | | | | Sb/Sn | | FILM THICKNESS |
|---|---|---|---|---|---|---|---|---|---|---|
| | $N_2$ | $O_2$ | HF | Sn | Sb | Si | $C_2H_4$ | (MOLE RATIO) | FILM KIND | (nm) |
| 3RD LAYER | 15 | 6 | 0 | 4 | 1 | 0 | 0 | 0.09 | SnSbOx | 50 |
| 4TH LAYER | 6 | 4 | 1 | 4 | 0 | 0 | 0 | | $SnO_2$:F | 310 |
| 3 | | | | | | | | | | |
| 1ST LAYER | 6 | 4 | 0 | 1 | 0 | 0 | 0 | | $SnO_2$ | 25 |
| 2ND LAYER | 200 | 4 | 0 | 0 | 0 | 1 | 6 | | $SiO_2$ | 25 |
| 3RD LAYER | 6 | 4 | 1 | 4 | 0 | 0 | 0 | | $SnO_2$:F | 350 |
| 4TH LAYER | 12 | 5 | 0 | 3 | 1 | 0 | 0 | 0.12 | SnSbOx | 25 |
| 4 | | | | | | | | | | |
| 1ST LAYER | 6 | 4 | 0 | 1 | 0 | 0 | 0 | | $SnO_2$ | 25 |
| 2ND LAYER | 200 | 4 | 0 | 0 | 0 | 1 | 6 | | $SiO_2$ | 25 |
| 3RD LAYER | 6 | 4 | 1 | 4 | 0 | 0 | 0 | | $SnO_2$:F | 250 |
| 4TH LAYER | 30 | 15 | 0 | 10 | 1 | 0 | 0 | 0.04 | SnSbOx | 200 |
| 5 | | | | | | | | | | |
| 1ST LAYER | 6 | 4 | 0 | 1 | 0 | 0 | 0 | | $SnO_2$ | 25 |
| 2ND LAYER | 200 | 4 | 0 | 0 | 0 | 1 | 6 | | $SiO_2$ | 25 |
| 3RD LAYER | 6 | 4 | 1 | 4 | 0 | 0 | 0 | | $SnO_2$:F | 350 |
| 4TH LAYER | 3 | 2 | 0 | 1 | 1 | 0 | 0 | 0.19 | SnSbOx | 25 |
| 6 | | | | | | | | | | |
| 1ST LAYER | 12 | 5 | 0 | 3 | 1 | 0 | 0 | 0.12 | SnSbOx | 25 |
| 2ND LAYER | 200 | 4 | 0 | 0 | 0 | 1 | 6 | | $SiO_2$ | 25 |
| 3RD LAYER | 6 | 4 | 1 | 4 | 0 | 0 | 0 | | $SnO_2$:F | 350 |
| 7 | | | | | | | | | | |
| 1ST LAYER | 6 | 4 | 0 | 1 | 0 | 0 | 0 | | $SnO_2$ | 25 |
| 2ND LAYER | 200 | 4 | 0 | 0 | 0 | 1 | 6 | | $SiO_2$ | 25 |
| 3RD LAYER | 30 | 15 | 0 | 10 | 1 | 0 | 0 | 0.04 | SnSbOx | 200 |
| 4TH LAYER | 6 | 4 | 1 | 4 | 0 | 0 | 0 | | $SnO_2$:F | 250 |
| 8 | | | | | | | | | | |
| 1ST LAYER | 6 | 4 | 0 | 1 | 0 | 0 | 0 | | $SnO_2$ | 41 |
| 2ND LAYER | 200 | 4 | 0 | 0 | 0 | 1 | 6 | | $SiO_2$ | 21 |
| 3RD LAYER | 40 | 20 | 0 | 13 | 1 | 0 | 0 | 0.03 | SnSbOx | 210 |
| 4TH LAYER | 6 | 4 | 1 | 4 | 0 | 0 | 0 | | $SnO_2$:F | 240 |
| COMPARATIVE EXAMPLES | | | | | | | | | | |
| 1 | | | | | | | | | | |
| 1ST LAYER | 6 | 4 | 0 | 1 | 0 | 0 | 0 | | $SnO_2$ | 25 |
| 2ND LAYER | 200 | 4 | 0 | 0 | 0 | 1 | 6 | | $SiO_2$ | 25 |
| 3RD LAYER | 6 | 4 | 1 | 4 | 0 | 0 | 0 | | $SnO_2$:F | 350 |
| 2 | | | | | | | | | | |
| 1ST LAYER | 6 | 4 | 0 | 1 | 0 | 0 | 0 | | $SnO_2$ | 25 |
| 2ND LAYER | 200 | 4 | 0 | 0 | 0 | 1 | 6 | | $SiO_2$ | 25 |
| 3RD LAYER | 6 | 4 | 1 | 4 | 0 | 0 | 0 | | $SnO_2$:F | 350 |
| 4TH LAYER | 12 | 5 | 0 | 3 | 2 | 0 | 0 | 0.22 | SnSbOx | 25 |
| 3 | | | | | | | | | | |
| 1ST LAYER | 200 | 4 | 0 | 0 | 0 | 1 | 6 | | $SiO_2$ | 25 |
| 2ND LAYER | 6 | 4 | 1 | 4 | 0 | 0 | 0 | | $SnO_2$:F | 350 |
| 3RD LAYER | 12 | 5 | 0 | 3 | 1 | 0 | 0 | 0.12 | SnSbOx | 25 |
| 4 | | | | | | | | | | |
| 1ST LAYER | 6 | 4 | 0 | 1 | 0 | 0 | 0 | | $SnO_2$ | 25 |
| 2ND LAYER | 200 | 4 | 0 | 0 | 0 | 1 | 6 | | $SiO_2$ | 25 |
| 3RD LAYER | 120 | 60 | 0 | 40 | 1 | 0 | 0 | 0.009 | SnSbOx | 200 |
| 4TH LAYER | 6 | 4 | 1 | 4 | 0 | 0 | 0 | | $SnO_2$:F | 250 | material gas, which was supplied onto the $SiO_2$ film 3 to form the $SnSbO_x$ film 4 having a film thickness of 200 nm as a third layer on the $SiO_2$ film 3. Then, monobutyltin trichloride containing chlorine was used as a tin raw material, and hydrogen fluoride as a fluorine compound, and steam of the monobutyltin trichloride, oxygen, steam of the hydrogen fluoride, and nitrogen were blended in a predetermined mole ratio into a raw material gas, which was supplied onto the $SnSbO_x$ film 4 to form the $SnO_2$:F film 5 having a film thickness of 250 nm as a fourth layer on the $SnSbO_x$ film 4. In this way, a test piece of a film structure of glass substrate 1/$SnO_2$ film 2/$SiO_2$ film 3/$SnSbO_x$ film 4/$SnO_2$:F film 5 was prepared as Example 1, as shown in FIG. 1.

In the formation of the test piece, the amounts of monobutyltin trichloride and antimony trichloride were adjusted such that the antimony content in the $SnSbO_x$ film 4 as the third layer was 0.04 in terms of mole ratio relative to tin.

Example 2

Similarly to Example 1, first, steam of the monobutyltin trichloride, oxygen and nitrogen were blended in a predetermined mole ratio into a raw material gas, which was supplied onto the glass substrate 1 to form the $SnO_2$ film 2 having a film thickness of 25 nm on the glass substrate 1. Then, monosilane, oxygen, nitrogen, and ethylene as an additive were blended in a predetermined mole ratio into a raw material gas, which was supplied onto the $SnO_2$ film 2 to form the $SiO_2$ film 3 having a film thickness of 25 nm on the $SnO_2$ film 2. Then, steam of the monobutyltin trichloride, oxygen, steam of the antimony trichloride, and nitrogen were blended in a predetermined mole ratio into a raw material gas, which was supplied onto the $SiO_2$ film 3 to form the $SnSbO_x$ film 4 having a film thickness of 50 nm on the $SiO_2$ film 3. Lastly, steam of the monobutyltin trichloride, oxygen, steam of the hydrogen fluoride, and nitrogen were blended in a predetermined mole ratio into a raw material gas, which was supplied onto the $SnSbO_x$ film 4 to form the $SnO_2$:F film 5 having a film thickness of 310 nm on the $SnSbO_x$ film 4. In this way, a test piece of a film structure of glass substrate 1/$SnO_2$ film 2/$SiO_2$ film 3/$SnSbO_x$ film 4/$SnO_2$:F film 5 similar to Example 1 was prepared as Example 2.

In the formation of the test piece, the amounts of monobutyltin trichloride and antimony trichloride were adjusted such that the antimony content in the SnSbO film 4 as the third layer was 0.09 in terms of mole ratio relative to tin.

Example 3

First, as a tin raw material, monobutyltin trichloride containing chlorine was used. Steam of the monobutyltin trichloride, oxygen and nitrogen were blended in a predetermined mole ratio into a raw material gas. The raw material gas was supplied onto the glass substrate 1 to form the $SnO_2$ film 2 having a film thickness of 25 nm as a first layer on the glass substrate 1. Then, as a silicon raw material, monosilane was used, and the monosilane, oxygen, nitrogen, and ethylene as an additive were blended in a predetermined mole ratio into a raw material gas. This raw material gas was supplied onto the $SnO_2$ film 2 to form the $SiO_2$ film 3 having a film thickness of 25 nm as a second layer on the $SnO_2$ film 2. Then, monobutyltin trichloride containing chlorine was used as a tin raw material, and hydrogen fluoride as a fluorine compound, and steam of the monobutyltin trichloride, oxygen, steam of the hydrogen fluoride, and nitrogen were blended in a predetermined mole ratio into a raw material gas, which was supplied onto the $SiO_2$ film 3 to form the $SnO_2$:F film 5 having a film thickness of 350 nm as a third layer on the $SiO_2$ film 3. Then, monobutyltin trichloride containing chlorine was used as a tin raw material, and antimony trichloride as an antimony compound, and steam of the monobutyltin trichloride, oxygen, steam of the antimony trichloride, and nitrogen were blended in a predetermined mole ratio into a raw material gas, which was supplied onto the $SnO_2$:F film 5 to form the $SnSbO_x$ film 4 having a film thickness of 25 nm as a fourth layer on the $SnO_2$:F film 5. In this way, a test piece of a film structure of glass substrate 1/$SnO_2$ film 2/$SiO_2$ film 3/$SnO_2$:F film 5/$SnSbO_x$ film 4 was prepared as Example 3, as shown in FIG. 2.

In the formation of the test piece, the amounts of monobutyltin trichloride and antimony trichloride were adjusted such that the antimony content in the SnSbOx film 4 as the fourth layer was 0.12 in terms of mole ratio relative to tin.

Example 4

Similarly to Example 3, steam of the monobutyltin trichloride, oxygen and nitrogen were blended in a predetermined mole ratio into a raw material gas, which was supplied onto the glass substrate 1 to form the $SnO_2$ film 2 having a film thickness of 25 nm on the glass substrate 1. Then, the monosilane, oxygen, nitrogen, and ethylene as an additive were blended in a predetermined mole ratio into a raw material gas, which was supplied onto the $SnO_2$ film 2 to form the $SiO_2$ film 3 having a film thickness of 25 nm on the $SnO_2$ film 2. Then, steam of the monobutyltin trichloride, oxygen, steam of the hydrogen fluoride, and nitrogen were blended in a predetermined mole ratio into a raw material gas, which was supplied onto the $SiO_2$ film 3 to form the $SnO_2$:F film having a film thickness of 250 nm as a third layer on the $SiO_2$ film 3. Lastly, steam of the monobutyltin trichloride, oxygen, steam of the antimony trichloride, and nitrogen were blended in a predetermined mole ratio into a raw material gas, which was supplied onto the $SnO_2$:F film 5 to form the SnSbOx film 4 having a film thickness of 200 nm on the $SnO_2$:F film 5. In this way, a test piece of a film structure of glass substrate 1/$SnO_2$ film 2/$SiO_2$ film 3/$SnO_2$:F film 5/$SnSbO_x$ film 4 similar to Example 3 was prepared as Example 4.

In the formation of the test piece, the amounts of monobutyltin trichloride and antimony trichloride were adjusted such that the antimony content in the $SnSbO_x$ film 4 as the fourth layer was 0.04 in terms of mole ratio relative to tin.

Example 5

Similarly to Example 3, steam of the monobutyltin trichloride, oxygen and nitrogen were blended in a predetermined mole ratio into a raw material gas, which was supplied onto the glass substrate 1 to form the $SnO_2$ film 2 having a film thickness of 25 nm on the glass substrate 1. Then, the monosilane, oxygen, nitrogen, and ethylene as an additive were blended in a predetermined mole ratio into a raw material gas, which was supplied onto the $SnO_2$ film 2 to form the $SiO_2$ film 3 having a film thickness of 25 nm on the $SnO_2$ film 2. Then, steam of the monobutyltin trichloride, oxygen, steam of the hydrogen fluoride, and nitrogen were blended in a predetermined mole ratio into a raw material gas, which was supplied onto the $SiO_2$ film 3 to form the $SnO_2$:F film 5 having a film thickness of 350 nm as a third layer on the $SiO_2$ film 3. Lastly, steam of the monobutyltin trichloride, oxygen, steam of the antimony trichloride, and nitrogen were blended in a predetermined mole ratio into a raw material gas, which was supplied onto the $SnO_2$:F film 5 to form the $SnSbO_x$ film 4 having a film thickness of 25 nm on the $SnO_2$:F film 5. In this way, a test piece of a film structure of glass substrate 1/$SnO_2$ film 2/$SiO_2$ film 3/$SnO_2$:F film 5/$SnSbO_x$ film 4 similar to Example 3 was prepared as Example 5.

In the formation of the test piece, the amounts of monobutyltin trichloride and antimony trichloride were adjusted such that the antimony content in the $SnSbO_x$ film 4 as the fourth layer was 0.19 in terms of mole ratio relative to tin.

Example 6

First, as a tin raw material, monobutyltin trichloride containing chlorine was used as a tin raw material, and antimony trichloride as an antimony compound, and steam of the monobutyltin trichloride, oxygen, steam of the antimony trichloride, and nitrogen were blended in a predetermined mole ratio into a raw material gas, which was supplied onto the glass substrate 1 to form the $SnSbO_x$ film 4 having a film thickness of 25 nm as a first layer on the glass substrate 1. Then, as a silicon raw material, monosilane was used, and the monosilane, oxygen, nitrogen, and ethylene as an additive were blended in a predetermined mole ratio into a raw material gas. This raw material gas was supplied onto the $SnSbO_x$ film 4 to form the $SiO_2$ film 3 having a film thickness of 25 nm as a second layer on the $SnSbO_x$ film 4. Then, monobutyltin trichloride containing chlorine was used as a tin raw material, and hydrogen fluoride as a fluorine compound, and steam of the monobutyltin trichloride, oxygen, steam of the hydrogen fluoride, and nitrogen were blended in a predetermined mole ratio into a raw material gas, which was supplied onto the $SiO_2$ film 3 to form the $SnO_2$:F film 5 having a film thickness of 350 nm as a third layer on the $SiO_2$ film 3. In this way, a test piece of a film structure of glass substrate 1/$SnSbO_x$ film 4/$SiO_2$ film 3/$SnO_2$:F film 5 was prepared as Example 6, as shown in FIG. 3.

In the formation of the test piece, the amounts of monobutyltin trichloride and antimony trichloride were adjusted such that the antimony content in the $SnSbO_x$ film 4 as the first layer was 0.12 in terms of mole ratio relative to tin.

Example 7

In Example 7, a test piece having a film structure similar to Example 1 was prepared by the on-line CVD method (see FIG. 4).

More specifically, first, a glass raw material powder such as silica sand or soda ash was charged into the melting furnace 11 heated to 1500 to 1600° C. to melt the glass raw material powder in the melting furnace 11, and then the resulting molten glass was charged into the bath 12. Then, in the bath 12, the molten glass was formed into a ribbon-like shape as the glass ribbon 15 due to the molten tin 14, and the glass ribbon 15 was conveyed downstream of the film-forming raw material supply part 16 while being maintained at a high temperature of 600 to 750° C.

Then, formation of films was carried out using monobutyltin trichloride containing chlorine as a tin raw material, monosilane as a silicon raw material, antimony trichloride as an antimony compound, and hydrogen fluoride as a fluorine compound, by the thermal decomposition CVD method. More specifically, from the first film-forming raw material supply port 16a monobutyltin trichloride diluted with nitrogen, oxygen and water were supplied onto a surface of the glass ribbon 15 to form the $SnO_2$ film 2 having a film thickness of 25 nm as a first layer on the glass ribbon 15. Then, from the second film-forming raw material supply port 16b monosilane diluted with nitrogen, oxygen, and ethylene as an additive were supplied onto the $SnO_2$ film 2 to form the $SiO_2$ film 3 having a film thickness of 25 nm as a second layer on the $SnO_2$ film 2. Then, from the third film-forming raw material supply port 16c a mixture gas of monobutyltin trichloride diluted with nitrogen, antimony trichloride, oxygen and water steam was supplied onto the $SiO_2$ film 3 to form the $SnSbO_x$ film 4 having, a film thickness of 200 nm as a third layer on the $SiO_2$ film 3, and from the fourth film-forming raw material supply port 16d a mixture gas of steams of monobutyltin trichlotide and hydrogen fluoride diluted with nitrogen, oxygen and water steam was supplied onto the $SnSbO_x$ film 4 to form the $SnO_2$:F film 5 having a film thickness of 250 nm as a fourth layer on the $SnSbO_x$ film 4. In this way, a test piece of a film structure of glass substrate 1/$SnO_2$ film 2/$SiO_2$ film 3/$SnSbO_x$ film 4/$SnO_2$:F film 5 was prepared as Example 7 by the on-line CVD method.

In the formation of the test piece, the amounts of monobutyltin trichloride and antimony trichloride were adjusted such that the antimony content in the $SnSbO_x$ film 4 as the third layer was 0.04 in terms of mole ratio relative to tin.

Example 8

Similarly to Example 7, first, a glass raw material powder such as silica sand or soda ash was charged into the melting furnace 11 heated to 1500 to 1600° C. to melt the glass raw material powder in the melting furnace 11, and then the resulting molten glass was charged into the bath 12. Then, in the bath 12, the molten glass was formed into a ribbon-like shape as the glass ribbon 15 due to the molten tin 14, and the glass ribbon 15 was conveyed downstream of the film-forming raw material supply part 16 while being maintained at a high temperature of 600 to 750° C.

Then, formation of films was carried out using monobutyltin trichloride containing chlorine as a tin raw material, monosilane as a silicon raw material, antimony trichloride as an antimony compound, and hydrogen fluoride as a fluorine compound, by the thermal decomposition CVD method. More specifically, from the first film-forming raw material supply port 16a monobutyltin trichloride diluted with nitrogen, oxygen and water were supplied onto a surface of the glass ribbon 15 to form the $SnO_2$ film 2 having a film thickness of 41 nm as a first layer on the glass ribbon 15. Then, from the second film-forming raw material supply port. 16b monosilane diluted with nitrogen, oxygen, and ethylene as an additive were supplied onto the $SnO_2$ film 2 to form the $SiO_2$ film 3 having a film thickness of 21 nm as a second layer on the $SnO_2$ film 2. Then, from the third film-forming raw material supply port 16c a mixture gas of monobutyltin trichloride diluted with nitrogen, antimony trichloride, oxygen and water steam was supplied onto the $SiO_2$ film 3 to form the $SnSbO_x$ film 4 having a film thickness of 210 nm as a third layer on the $SiO_2$ film 3, and from the fourth film-forming raw material supply port 16d a mixture gas of steams of monobutyltin trichloride and hydrogen fluoride diluted with nitrogen, oxygen and water steam was supplied onto the $SnSbO_x$ film 4 to form the $SnO_2$:F film 5 having a film thickness of 240 nm as a fourth layer on the $SnSbO_x$ film 4. In this way, a test piece of a film structure of glass substrate 1/$SnO_2$ film 2/$SiO_2$ film 3/$SnsbO_x$ film 4/$SnO_2$:F film 5 was prepared as Example 8 by the on-line CVD method.

In the formation of the test piece, the amounts of monobutyltin trichloride and antimony trichloride were adjusted such that the antimony content in the $SnSbO_x$ film 4 as the third layer was 0.03 in terms of mole ratio relative to tin, and the amounts of monobutyltin trichloride and hydrogen fluoride were adjusted such that the fluorine content in the fourth layer of $SnO_2$:F film 5 was 0.45 wt %.

Comparative Example 1

A test piece having a film structure of glass substrate 1/$SnO_2$ film 2/$SiO_2$ film 3/$SnO_2$:F film 5 was prepared as Comparative Example 1 by the CVD method similar to that used for preparing Examples 1 to 6.

More specifically, first, steam of the monobutyltin trichloride, oxygen and nitrogen were blended in a predetermined mole ratio into a raw material gas, which was supplied onto the glass substrate 1 to form the $SnO_2$ film 2 having a film thickness of 25 nm as a first layer on the glass substrate 1. Then, the monosilane, oxygen, nitrogen, and ethylene were blended in a predetermined mole ratio into a raw material gas, which was supplied onto the $SnO_2$ film 2 to form the $SiO_2$ film 3 having a film thickness of 25 nm as a second layer on the $SnO_2$ film 2. Then, steam of the monobutyltin trichloride, oxygen, steam of the hydrogen fluoride, and nitrogen were blended in a predetermined mole ratio into a raw material gas, which was supplied onto the SiO$_2$ film 3 to form the SnO$_2$:F film 5 having a film thickness of 350 nm as a third layer on the SiO$_2$ film 3, to thus obtain a test piece of Comparative Example 1.

Comparative Example 2

A test piece having a film structure of glass substrate 1/SnO$_2$ film 2/SiO$_2$ film 3/SnO$_2$:F film 5/SnSbO$_x$ film 4 was prepared as Comparative Example 2 in which the mole ratio of antimony to tin in the SnSbO$_x$ film 4 exceeds 0.2, by the CVD method similar to that used for preparing Examples 1 to 6.

More specifically, first, steam of the monobutyltin trichloride, oxygen and nitrogen were blended in a predetermined mole ratio into a raw material gas, which was supplied onto the glass substrate 1 to form the SnO$_2$ film 2 having a film thickness of 25 nm as a first layer on the glass substrate 1. Then, the monosilane, oxygen, nitrogen, and ethylene were blended in a predetermined mole ratio into a raw material gas, which was supplied onto the SnO$_2$ film 2 to form the SiO$_2$ film 3 having a film thickness of 25 nm as a second layer on the SnO$_2$ film 2. Then, steam of the monobutyltin trichloride, oxygen, steam of the hydrogen fluoride, and nitrogen were blended in a predetermined mole ratio into a raw material gas, which was supplied onto the SiO$_2$ film 3 to form the SnO$_2$:F film 5 having a film thickness of 350 nm as a third layer on the SiO$_2$ film 3. Then, steam of the monobutyltin trichloride, oxygen, steam of antimony trichloride, and nitrogen were blended in a predetermined mole ratio into a raw material gas, which was supplied onto the SnO$_2$:F film 5 to form the SnSbO$_x$ film 4 having a film thickness of 25 nm as a fourth layer on the SnO$_2$:F film 5, to thereby prepare a test piece of Comparative Example 2.

In the formation of the test piece, the amounts of monobutyltin trichloride and antimony trichloride were adjusted such that the antimony content in the SnSbO$_x$ film 4 as the fourth layer was 0.22 in terms of mole ratio relative to tin.

Comparative Example 3

A test piece having a film structure of glass substrate 1/SiO$_2$ film 3/SnO$_2$:F film 5/SnSbO$_x$ film 4 was prepared as Comparative Example 3 by the CVD method similar to that used for preparing Examples 1 to 6.

More specifically, first, the monosilane, oxygen, nitrogen, and ethylene were blended in a predetermined mole ratio into a raw material gas, which was supplied onto the glass substrate 1 to form the SiO$_2$ film 3 having a film thickness of 25 nm as a first layer on the glass substrate 1. Then, steam of the monobutyltin trichloride, oxygen, steam of the hydrogen fluoride, and nitrogen were blended in a predetermined mole ratio into a raw material gas, which was supplied onto the SiO$_2$ film 3 to form the SnO$_2$:F film 5 having a film thickness of 350 nm as a second layer on the SiO$_2$ film 3. Then, steam of the monobutyltin trichloride, oxygen, steam of the antimony trichloride, and nitrogen were blended in a predetermined mole ratio into a raw material gas, which was supplied onto the SnO$_2$:F film 5 to form the SnSbO$_x$ film 4 having a film thickness of 25 nm as a third layer on the SnO$_2$:F film 5, to thereby prepare a test piece of Comparative Example 3.

In the formation of the test piece, the amounts of monobutyltin trichloride and antimony trichloride were adjusted such that the antimony content in the SnSbO$_x$ film 4 as the third layer was 0.12 in terms of mole ratio relative to tin.

Comparative Example 4

A test piece having a film structure of glass substrate 1/SnO$_2$ film 2/SiO$_2$ film 3/SnSbO$_x$ film 4/SnO$_2$:F film 5 was prepared as Comparative Example 4 in which the mole ratio of antimony to tin in the SnSbOX film 4 is less than 0.01, by the CVD method similar to that used for preparing Examples 1 to 6.

More specifically, first, steam of the monobutyltin trichloride, oxygen and nitrogen were blended in a predetermined mole ratio into a raw material gas, which was supplied onto the glass substrate 1 to form the SnO$_2$ film 2 having a film thickness of 25 nm as a first layer on the glass substrate 1. Then, the monosilane, oxygen, nitrogen, and ethylene as an additive were blended in a predetermined mole ratio into a raw material gas, which was supplied onto the SnO$_2$ film 2 to form the SiO$_2$ film 3 having a film thickness of 25 nm as a second layer on the SnO$_2$ film 2. Then, steam of the monobutyltin trichloride, oxygen, steam of the antimony trichloride, and nitrogen were blended in a predetermined mole ratio into a raw material gas, which was supplied onto the siO$_2$ film 3 to form the SnSbO$_x$ film 4 having a film thickness of 200 nm as a third layer on the SiO$_2$ film 3. Then, steam of the monobutyltin trichloride, oxygen, steam of the hydrogen fluoride, and nitrogen were blended in a predetermined mole ratio into a raw material gas, which was supplied onto the SnSbO$_x$ film 4 to form the SnO$_2$:F film S having a film thickness of 250 nm as a fourth layer on the SnSbO$_x$ film 4, to thereby prepare a test piece of Comparative Example 4.

In the formation of the test piece, the amounts of monobutyltin trichloride and antimony trichloride were adjusted such that the antimony content in the SnSbO$_x$ film 4 as the third layer was 0.009 in terms of mole ratio relative to tin.

The thus obtained test pieces (Examples Nos. 1 to 7 and Comparative Examples Nos. 1 to 4) were measured according to JIS R3106 for visible light transmittance, solar radiation light transmittance, and vertical radiation ratio (emissivity), as scales for the transparency, the solar heat shading property, and the heat insulating property of the glass, respectively. Further, a visual observation was conducted to examine the unevenness of the color of the glass.

To measure the visible light transmittance and solar radiation light transmittance, a spectrophotometer Model 330 manufactured by Hitachi, Ltd. was used, and to measure the infrared reflectance to calculate the vertical radiation ratio, an infrared spectrophotometer Model 270-30 manufactured by Hitachi, Ltd. was used.

Table 2 shows the measurement results of the examples and the comparative examples.

In Table 2, the results of the visual observation on the unevenness of the color are represented by the symbols ○, Δ and ×, which mean good, acceptable, and unsatisfactory, respectively.

Table 2

|  |  | VISIBLE LIGHT TRANSMITTANCE (%) | SOLAR RADIATION LIGHT TRANSMITTANCE (%) | VERTICAL RADIATION RATIO (−) | UNEVENNESS OF THE COLOR |
|---|---|---|---|---|---|
| EXAMPLES ACCORDING TO PRESENT INVENTION | 1 | 75.7 | 63.5 | 0.13 | ○ |
|  | 2 | 77.0 | 66.9 | 0.13 | ○ |
|  | 3 | 78.1 | 68.9 | 0.13 | ○ |
|  | 4 | 75.5 | 63.4 | 0.13 | ○ |
|  | 5 | 75.4 | 66.5 | 0.13 | ○ |
|  | 6 | 77.9 | 68.8 | 0.13 | △ |
|  | 7 | 75.9 | 64.2 | 0.13 | ○ |
|  | 8 | 78.8 | 64.0 | 0.13 | ○ |
| COMPARATIVE EXAMPLES | 1 | 81.7 | 71.5 | 0.13 | ○ |
|  | 2 | 73.9 | 69.0 | 0.13 | ○ |
|  | 3 | 78.0 | 68.9 | 0.13 | × |
|  | 4 | 81.6 | 71.3 | 0.13 | ○ |

The visible light transmittance of a single low-E glass plate should be over 75%, taking into consideration that the glass may be used in double glazing. Further, the solar radiation light transmittance should be in a range of 60 to 70% in order to achieve a good solar heat shading property irrespective of a region or location. In addition, the vertical radiation ration should be 0.2 or less in order to maintain an agreeable low emissivity as well as a desired heat insulating property.

When the measurement results are analyzed according to the above criteria, Comparative Example 1 has a high visible light transmittance of 81.7% providing sufficient transparency, and further has a low vertical radiation ratio of 0.13 providing a required heat insulating property, and further, does not show unevenness in color. However, since the $SnSbO_x$ film is not contained in the metallic oxide based film of Comparative Example 1, the solar radiation transmittance is high (71.5%), which means that the glass cannot effectively shut out the infrared light in the sun light, resulting in an insufficient solar heat shading property. Therefore, although Comparative Example 1 may be suitable for glass used in a cold region, in terms of heat insulating property, it is not suitable for glass used in a region where the heat is severe or at an installation location where there is a much solar energy inflow into the room.

Comparative Example 2 has a solar radiation transmittance of 69.0% providing a sufficient solar heat shading property, as well as a low vertical radiation ratio of 0.13 providing a required heat insulating property, and further, does not show unevenness in color. However, the mole ratio (=Sb/Sn) in the SnSbOx film is large (0.22, i.e. greater than 0.2), resulting in a low visible light transmittance (73.9%). Therefore, if the glass is incorporated in double glazing, as described later, the visible light transmittance is lowered and the glass looses its transparency, causing discomfort to people in the room or the automobile. Therefore, the low-E glass of Comparative Example 2 may only be used as a single glass plate, and thus its application is limited.

Comparative Example 3 has a high visible light transmittance of 78.0% providing sufficient transparency, and a solar radiation transmittance ratio of 68.9% providing a sufficient solar heat shading property, as well as a low vertical radiation ratio of 0.13 providing a required heat insulating property. However, the mole ratio (=Sb/Sn) in the SnSbOx film is large (0.12, i.e. greater than 0.1), making it not possible to adjust the color tone as desired, resulting in an unevenness in color, causing the appearance of the glass to be degraded.

Further, Comparative Example 4 has a high visible light transmittance of 81.6% providing sufficient transparency, and a low vertical radiation ratio of 0.13 providing a required heat insulating property, and further, does not show unevenness in color. However, the mole ratio of antimony to tin is small (0.009, i.e. less than 0.01), causing a high solar radiation transmittance (71.3%) such that the desired solar heat shading property cannot be achieved.

On the other hand, Examples Nos. 1 to 8 all have visible light transmittance values of 75% or more providing sufficient transparency, and have the solar radiation transmittance within a range of 60 to 70% providing a good solar heat shading property irrespective of a region or installation location because it is possible to control the solar heat shading property within a certain range.

Examples Nos. 1, 2, 7 and 8 have a film structure of glass substrate 1/$SnO_2$ film 2/$SiO_2$ film 3/$SnSbO_x$ film 4/$SnO_2$:F film 5, however, since the mole ratio of antimony to tin in the $SnSbO_x$ film 4 is in a range of 0.01 to 0.1, unevenness in color does not occur. Further, the other Examples show practically satisfactory levels of unevenness in color.

Further, Example No. 8, which has the thickness of the films set such that $SnO_2$ film 2: 41 nm, $SiO_2$ film 3: 21 nm, $SnSbO_x$ film 4: 210 nm, and $SnO_2$:F film 5: 240 nm, the mole ratio of the antimony content in the $SnSbO_x$ film 4 set to 0.03, and the fluorine content in the $SnO_2$:F film 5 set to 0.45 weight %, had a visible light transmittance of 78.8% and solar radiation transmittance of 64.0%. The large difference between these two values contributed to keeping the glass reflection color tone to a natural and neutral color tone when viewed frontally or diagonally. In this connection, the reflection color viewed frontally from the opposite surface side to the film-coated surface (i.e. from the non-film-coated surface side) was examined using JIS Z8729 to determine the chromaticity components (psychometric chroma coordinates) a* and b* of the L*a*b* color system. The measured chromaticity components a* and b* were −0.2 and −0.5, respectively. When viewed diagonally from the non-film-coated surface side, the chromaticity components a* and b* were −0.9, and 2.3, respectively. (Generally, in the L*a*b* color system, reflection colors are regarded to be neutral when the chromaticity components a* and b* are in the relationship of $25 > a^{*2} + b^{*2}$)

Therefore, the low-E glass according to the present invention enables control of the solar heat shading property within a certain range, while providing a required heat insulating property due to the low emissivity thereof, and further possesses satisfactory transparency and color tone.

Next, the present inventors prepared a double glazing unit as shown in FIG. 5, by using the low-E glasses according to Examples Nos. 1, 3, 6 and Comparative Example No. 6. Visible light transmittance and the rate of inflow of solar energy into a room, that is, a solar radiation acquisition ratio as a scale for solar heat shading property, were measured according to JIS R3106, while a heat transfer coefficient as a scale for heat insulating property was measured according to JIS R3107.

To measure the visible light transmittance and the solar radiation acquisition ratio to calculate solar radiation light transmittance, the spectrophotometer Model 330 from Hitachi, Ltd. was used, and to measure the infrared reflectance to calculate the heat transfer coefficient, the infrared spectrometer Mode 270-30 from Hitachi, Ltd. was used.

Table 3 shows the measurement results of the examples and the comparative examples.

TABLE 3

| | | VISIBLE LIGHT TRANS- MITTANCE (%) | SOLAR RADIATION ACQUISITION RATIO (−) | HEAT TRANSFER COEFFICIENT (W/m² · K) |
|---|---|---|---|---|
| EXAMPLES ACCORDING TO PRESENT INVENTION | 1 3 6 | 70.0 71.0 71.0 | 0.64 0.65 0.65 | 2.3 2.3 2.3 |
| COMPARATIVE EXAMPLES | 1 | 75.5 | 0.70 | 2.3 |

The visible light transmittance of double glazing should be over 70%. Further, the solar radiation acquisition ratio should be approximately 0.65 in order to achieve a good solar heat shading property. In addition, the heat transfer coefficient should be less than 3.0 W/m²·K in order to maintain a desired heat insulating property.

The measurement results will now be analyzed by the above criteria. Comparative Example 1 has a high visible light transmittance of 75.5% providing sufficient transparency, and further has a low heat transfer coefficient of 2.3 W/m²·K providing a required heat insulating property. However, since the SnSbOx film is not contained in the film of the low-E glass of Comparative Example 1, the solar radiation acquisition ratio is high (0.70%), having the same result as in Table 2, that is, the solar heat shading property is insufficient and while the glass may be suitable for glass used in a cold region, it is not suitable for glass used in a region where the heat is severe or at an installment location where there is a much solar energy inflow into the room.

On the other hand, the double glazing of Examples Nos. 1 to 3 all have visible light transmittance values of 70% or more providing sufficient transparency, and have solar radiation acquisition ratio values of approximately 0.65 providing a desired solar heat shading property. Therefore, the present invention provides double glazing which has a desired solar heat shading property without spoiling the heat insulating property, to thereby enable realization of comfortable living conditions irrespective of the region and location where the double glazing is used.

What is claimed is:

1. A low emissivity glass comprising:
    a glass substrate having a surface; and
    a plurality of metallic oxide based films comprising metallic oxide laminated on the surface of said glass substrate,
    wherein said plurality of metallic oxide based films include a first tin oxide based film containing antimony, and a second tin oxide based film containing fluorine;
    wherein said glass substrate is a clear soda-lime float glass; and
    wherein said low emissivity glass has a vertical radiation ratio of not more than 0.2, a visible light transmittance not less than 75%, and a solar radiation light transmittance in a range of 60 to 70%.

2. A low emissivity glass as claimed in claim 1, further comprising:
    a third tin oxide based film consisting essentially of tin oxide formed on the surface of said glass substrate; and
    a silicon oxide based film formed on said third tin oxide based film,
    wherein at least said first tin oxide based film and said second tin oxide based film are laminated on said silicon oxide based film.

3. A low emissivity glass as claimed in claim 2, wherein said first tin oxide based film is formed on said silicon oxide based film, and said second tin oxide based film is formed on said first tin oxide based film, and wherein said first tin oxide based film contains antimony in an amount of 0.01 to 0.1 in terms of mole ratio relative to an amount of tin.

4. A low emissivity glass as claimed in claim 2, wherein said second tin oxide based film is formed on said silicon oxide based film, and said first tin oxide based film is formed on said second tin oxide film.

5. A low emissivity glass as claimed in claim 2, wherein at least one of said third tin oxide based film, said first tin oxide based film, and said second tin oxide based film contains chlorine.

6. A low emissivity glass comprising:
    a glass substrate having a surface:
    a plurality of metallic oxide based films comprising metallic oxide laminated on the surface of said glass substrate; and
    a silicon oxide based film;
    wherein said plurality of metallic oxide based films include a first tin oxide based film containing antimony, and a second tin oxide based film containing fluorine; and
    wherein said first tin oxide based film is formed on the surface of said glass substrate, said silicon oxide based film is formed on said first tin oxide based film, and said second tin oxide based film is formed on said silicon oxide based film.

7. A low emissivity glass as claimed in claim 6, wherein at least one of said first tin oxide based film and said second tin oxide based film contains chlorine.

8. A low emissivity glass as claimed in claim 1, wherein said glass substrate is formed from glass in a form of a ribbon formed by causing a glass raw material to flow on molten tin, and said plurality of metallic oxide based films are each formed by depositing a metallic oxide in solid phase on a surface of said glass in the form of a ribbon.

9. A glass article comprising a plurality of glass plates, at least one of which is formed of the low emissivity glass as claimed in claim 1, wherein said plurality of glass plates are arranged in opposed relation to each other with a hollow layer defined therebetween.

10. A low emissivity glass as claimed in claim 2, wherein at least one of said third tin oxide based film, said first tin oxide based film, and said second tin oxide based film contains chlorine.

11. A low emissivity glass as claimed in claim 3, wherein at least one of said third tin oxide based film, said first tin oxide based film, and said second tin oxide based film contains chlorine.

12. A low emissivity glass as claimed in claim 4, wherein at least one of said third tin oxide based film, said first tin oxide based film, and said second tin oxide based film contains chlorine.

13. A low emissivity glass as claimed in claim 4, wherein said first tin oxide based film contains antimony in an amount of 0.01 to 0.2 in terms of mole ratio relative to an amount of tin.

14. A low emissivity glass as claimed in claim 6, wherein said first tin oxide based film contains antimony in an amount of 0.01 to 0.2 in terms of mole ratio relative to an amount of tin.

15. A low emissivity glass as claimed in claim 2, wherein said glass substrate is formed from glass in a form of a ribbon formed by causing a glass raw material to flow on molten tin, and said plurality of metallic oxide based films are each formed by depositing a metallic oxide in solid phase on a surface of said glass in the form of a ribbon.

16. A low emissivity glass as claimed in claim 3, wherein said glass substrate is formed from glass in a form of a ribbon formed by causing a glass raw material to flow on molten tin, and said plurality of metallic oxide based films are each formed by depositing a metallic oxide in solid phase on a surface of said glass in the form of a ribbon.

17. A low emissivity glass as claimed in claim 4, wherein said glass substrate is formed from glass in a form of a ribbon formed by causing a glass raw material to flow on molten tin, and said plurality of metallic oxide based films are each formed by depositing a metallic oxide in solid phase on a surface of said glass in the form of a ribbon.

18. A low emissivity glass as claimed in claim 6, wherein said glass substrate is formed from glass in a form of a ribbon formed by causing a glass raw material to flow on molten tin, and said plurality of metallic oxide based films are each formed by depositing a metallic oxide in solid phase on a surface of said glass in the form of a ribbon.

19. A glass article comprising a plurality of glass plates, at least one of which is formed of the low emissivity glass as claimed in claim 2, wherein said plurality of glass plates are arranged in opposed relation to each other with a hollow layer defined therebetween.

20. A glass article comprising a plurality of glass plates, at least one of which is formed of the low emissivity glass as claimed in claim 3, wherein said plurality of glass plates are arranged in opposed relation to each other with a hollow layer defined therebetween.

21. A glass article comprising a plurality of glass plates, at least one of which is formed of the low emissivity glass as claimed in claim 4, wherein said plurality of glass plates are arranged in opposed relation to each other with a hollow layer defined therebetween.

22. A glass article comprising a plurality of glass plates, at least one of which is formed of the low emissivity glass as claimed in claim 6, wherein said plurality of glass plates are arranged in opposed relation to each other with a hollow layer defined therebetween.

* * * * *